Sept. 25, 1951          B. A. FULLER          2,568,799
SAW TABLE ATTACHMENT FOR SWIVEL SAWS
Filed Nov. 7, 1947          3 Sheets-Sheet 2
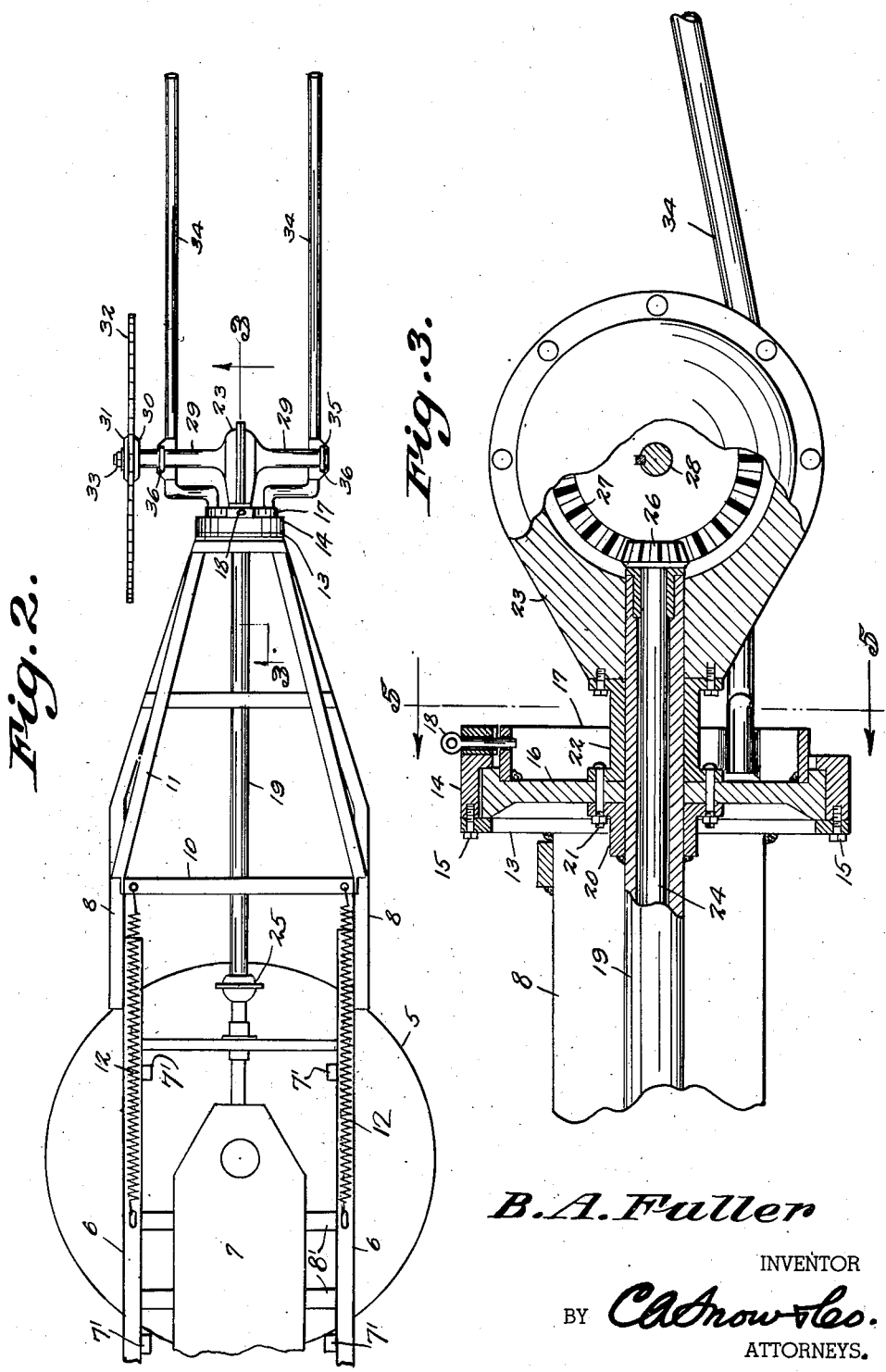
B. A. Fuller
INVENTOR
BY
ATTORNEYS.

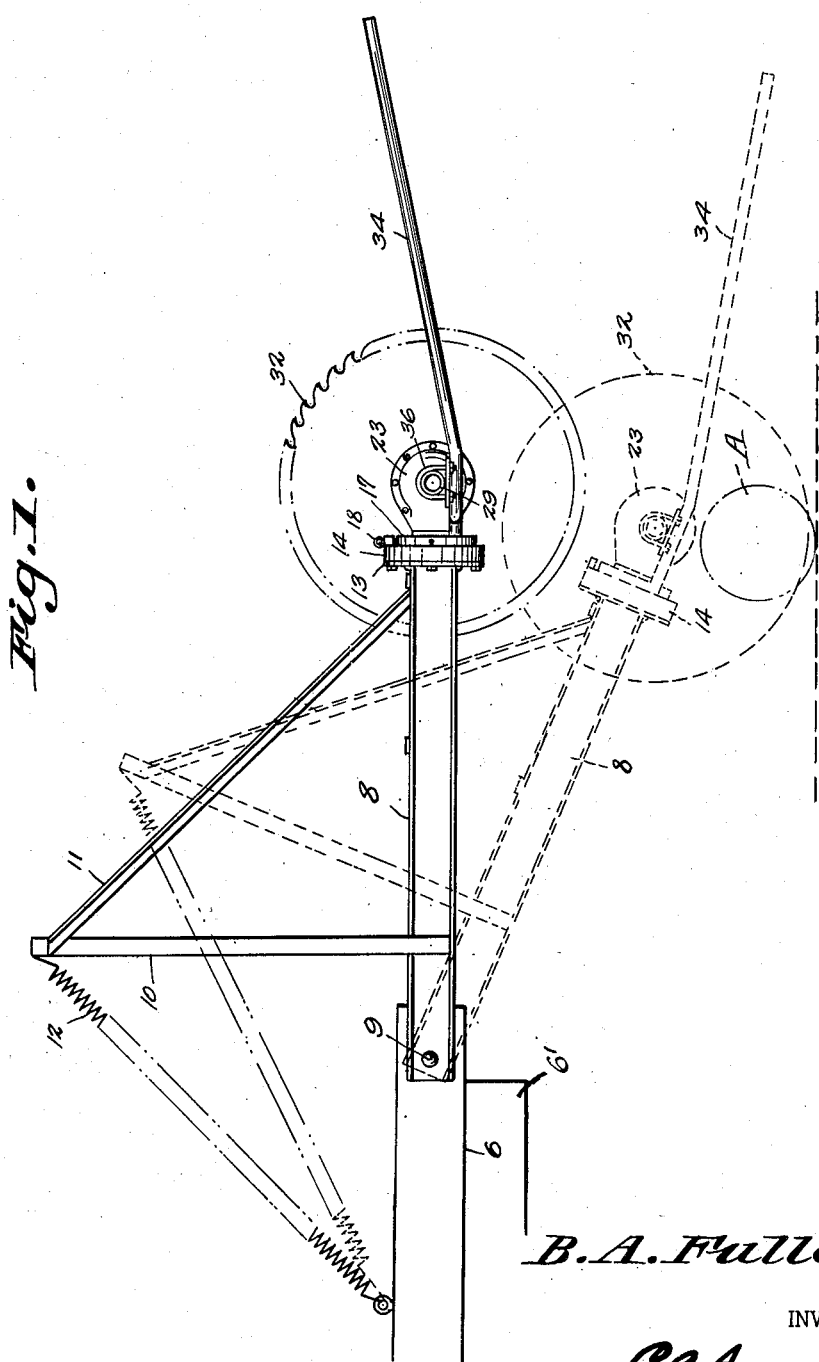

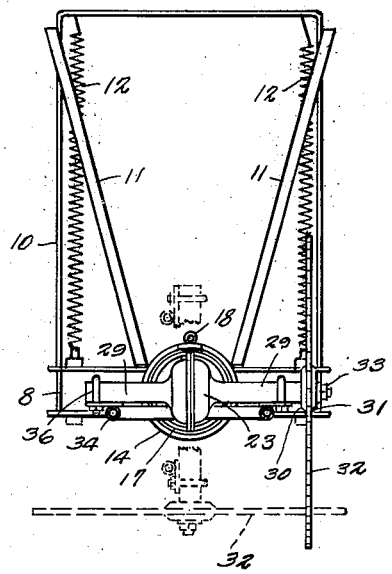
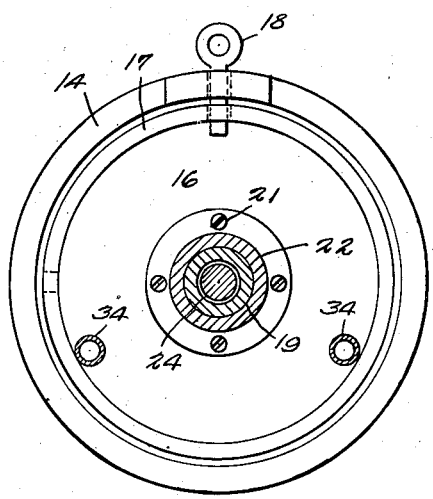
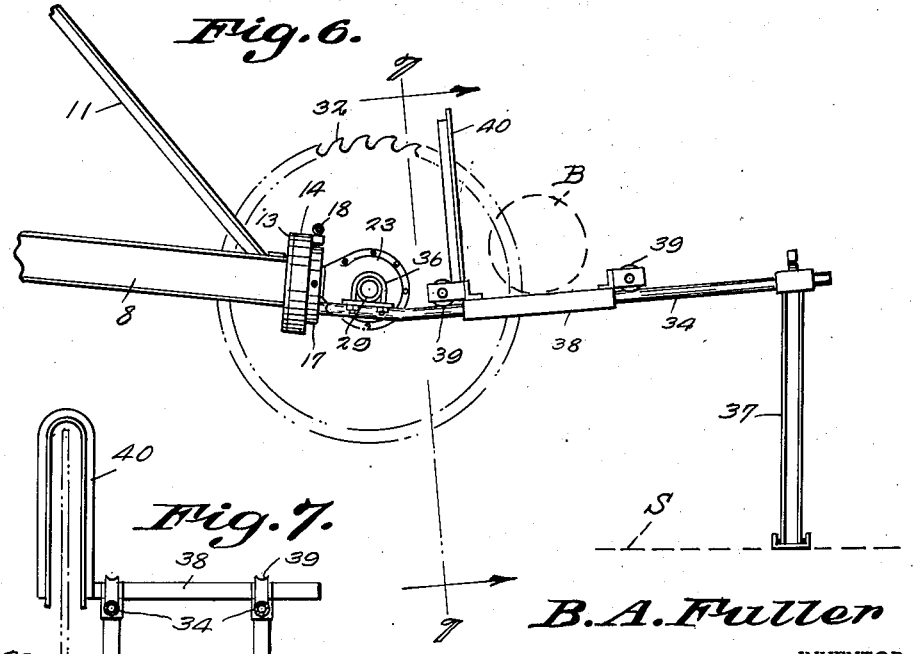
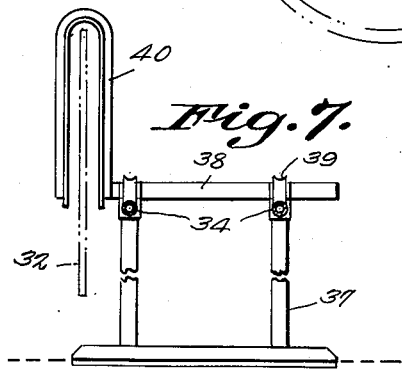

Patented Sept. 25, 1951

2,568,799

UNITED STATES PATENT OFFICE 2,568,799

SAW TABLE ATTACHMENT FOR SWIVEL SAWS

Byron A. Fuller, Neligh, Nebr.

Application November 7, 1947, Serial No. 784,713

1 Claim. (Cl. 143—47)

This invention relates to a motor-driven saw of the rotary type, that is particularly adapted for mounting on truck bodies or the like.

In the invention, I have had in mind as important purposes thereof the provision of a saw which, as a self-contained unit, is readily capable of mounting upon a truck body; that is of relatively uncomplicated, and very durable, construction; is easily operated and maintained; and is of far greater versatility, as to the types of operation performed, than other saws of the same general type commonly in use.

Briefly stated, the perferred form of the invention embodies, in its broadest aspects, a turn-table mountable upon a truck body that permits swinging of the saw to any point around the sides or rear of the body; a base that slides on the turn-table, permitting adjustment of the distance between the cutting end of the machine and the truck body; a supporting frame or boom pivoted to the base for up-and-down swinging movement, so that the saw blade can be positioned for cutting operations on the ground and at various distances above the ground; a saw mandrel swiveled on the end of the supporting frame, so that the saw blade can be positioned in horizontal or vertical planes, or in various angular planes therebetween; a circular blade carried by the mandrel; a power means; and a driving connection between the power means and mandrel, that will drive the saw in any position of adjustment of the turn-table, base, supporting frame, or mandrel. Additionally, the invention embodies, in combination with the machine described, a novel saw table attachment that permits use of the machine for sawing logs into stove lengths.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings

Figure 1 is a side elevational view of a saw constructed in accordance with the invention, the dotted lines indicating an adjusted position for sawing logs into blocks while lying on the ground.

Figure 2 is a top plan view.

Figure 3 is a section taken substantially on line 3—3 of Figure 2.

Figure 4 is an end elevational view taken from the right of Figure 1, the dotted lines indicating an adjusted position of the saw blade.

Figure 5 is a section on line 5—5 of Figure 3.

Figure 6 is a side elevational view showing the blade end of the machine, and the saw table attachment used therewith.

Figure 7 is a view taken substantially on line 7—7 of Figure 6.

Referring to the drawings in detail, at 5 (Fig. 2) is shown a turn-table which is rotatably mounted wherever desired. Preferably, the turn-table is mounted for rotation on a flat-bodied truck or the like (not shown). The turn-table, as will become apparent hereinafter, carries the whole device and thus the whole machine is readily transported for operations on the site, the truck being moved from tree to tree for felling.

Mounted upon the turn-table 5 for sliding movement thereon, is a base 6. Since the remaining portions of the machine, to be described, are carried by the base 6, it is seen that after the saw has been swung around with the turn-table, the distance of the blade itself from the truck body can be varied as necessary. The purpose of this construction is to permit the saw blade to be moved back and forth during the sawing of large logs, lying on the ground, into blocks. The base 6 comprises a pair of spaced parallel channel members slidably supported upon spaced parallel channel members 6' fixedly secured to the upper portion of the turntable 5. Flanges 7' secured to the members 6 and slidably engaging the members 6' can provide the desired slidable mounting. The motor 7 is supported upon cross members 8' extending between the members 6.

Fixedly mounted upon the base 6 is a motor 7 which can be, and preferably is, a conventional gasoline engine. A boom or supporting frame 8 is pivoted, for vertical swinging movement, to the base 6, the pivotal connections being shown at 9. The frame is of substantially elongated construction, projecting beyond the truck a suitable distance, and as best shown in Figure 2, tapers somewhat toward its outer end.

As part of the supporting frame 8, I provide an upstanding member 10 of inverted U-shaped formation, that is rigidly connected to the main portion of the frame. Diagonal braces 11 can be used to strengthen the construction.

Connected at one end to the top of the member 10, and at the other end to the base 6 (Figures 1 and 2) is a pair of strong and relatively elongated springs 12. The purpose of these springs is to control the vertical swinging movement of the supporting frame 8. Normally, the springs 12 hold the saw in the full line position shown in Figure 1. However, during cutting operation, the operator can urge the supporting frame downwardly against the action of the springs, as shown by the dotted lines in Figure 1.

Welded or otherwise permanently connected to the outer end of the supporting frame 8 is a supporting ring 13. A bearing ring 14 is immovably connected to the supporting ring, as by bolts 15 (Figure 3). The connected rings define an annular seat for a marginally flanged swivel 16. Welded to the outer face of swivel 16 is an annular lock plate 17.

The lock plate 17 is formed with a suitable number of openings, and in this connection, the bearing ring 14 has an extension overlying the lock plate 17. The extension of the bearing ring has an opening which is adapted to register with any of the openings of the lock plate, and thus it is seen that a drop pin 18 constitutes means for locking the normally rotatable swivel 16 against movement, as desired. The purpose of this arrangement, whereby the swivel 16 can be rotated as necessary, or can be locked in positions of rotatable adjustment, is to permit locking of the saw blade in adjusted positions, as for instance, when it is sawing logs on the ground or "buzzing" wood on a saw table, and to permit, additionally, swinging of the blade on its mandrel where a locked position is undesired, as for instance, in felling large trees.

At 19 is designated a substantially elongated drive shaft housing, one end of which as shown in Figure 3 extends through a central opening in the swivel 16, the housing 19 carrying a flanged collar 20 that is welded to the housing, and engages the inner face of the swivel. Collar 20 is connected to the swivel 16 by a plurality of bolts 21 or the like. Bolts 21 also serve to connect to the swivel 16 the flanged sleeve 22, to the other end of which is attached a gear housing 23.

A drive shaft 24 leading from the motor 7 is contained within the housing 19, and a universal joint 25 permits transmission of power through the drive shaft regardless of the position of angularity of the supporting frame 8 relative to base 6 carrying the motor. Drive shaft 24 projects into the gear housing 23, and carries on its end pinion 26 meshing with ring gear 27 contained within the gear housing. Ring gear 27 is keyed to the saw mandrel 28 journaled in opposed mandrel housings 29 integral with the gear housing 23.

At one end, the saw mandrel carries a clamping disc 30 that is permanently connected to the mandrel, and which opposes a removable clamping disc 31. A removable circular saw blade 32 is clamped between the discs, for rotation by the mandrel 28. Nut 33 holds the parts connected.

At 34 is shown a pair of spaced parallel handles these being rigidly attached, as by welding, to the annular lock plate 17 (Figure 3). The other ends of the handles 34 project outwardly beyond the blade 32. Intermediate their ends, the handles 34 carry small plates 35, receiving U-clamps 36 connecting the handles to the opposed ends of the mandrel housings 29.

By reason of this construction, it is seen that by grasping the handles 34, the operator can swing the blade 32 to various positions, as for instance, into a horizontal plane as indicated in dotted lines in Figure 4, or a vertical plane as indicated by the full lines in Figure 4. The blade can then be locked in these positions by use of the drop pin 18. Alternatively, the operator can, without locking the blade in position, vary the angularity of the blade relative to a tree being cut down, during the felling operation. During such an operation, of course, the blade 32 is positioned substantially in a horizontal plane, and is swung into the tree by means of the handles 34.

During the operation of "blocking" logs while lying on the ground, the blade 32 is positioned substantially in a vertical plane, and may if desired be locked in such position. Grasping the handles 34, the operator can then swing the blade down into the log for the purpose of sawing it into blocks. This operation is shown in dotted lines in Figure 1, in which the log is designated by the reference character A.

The last described operation, can, of course, be varied by utilizing the sliding movement of the base 6 as necessary.

Referring now to Figures 6 and 7, I provide an upstanding support 37 which can be detachably connected to the ends of the handles 34, so that they are spaced above the ground or other supporting surface S. This construction makes the saw capable of operation as a saw table, the handles 34 serving as tracks for a carriage 38 that is extended transversely across the handles, and carries wheels 39 which roll upon the handles. Carriage 38 may be provided with an inverted U-shaped guard 40 receiving the saw blade 32. When the machine is used in this manner, the saw blade 32 is locked in a vertical plane.

From this construction, it is seen that a log B carried by carriage 38 can be urged against the rotating blade 32, and I have found that this permits ready use of the saw for sawing logs into stove lengths, for example.

It is to be noted, with further reference to the saw table attachment, that the support for the handles includes vertical legs 37 between the lower ends of which extends a horizontal, ground-engaging base, the legs being adapted at their upper ends for rigid clamping engagement with the spaced parallel end portions of the handles. When so attached to the handles, the support retains the handles in a slightly inclined position, as seen in Fig. 6, so that the rollable carriage rolls down the handles toward the saw blade, thereby to increase the ease of operation, particularly when a heavy log is supported upon the carriage.

What is claimed is:

A saw table attachment for a swinging saw, said saw including a boom, a saw mandrel thereon, a circular saw blade on the mandrel, and gripping handles rigid with the mandrel and having wide spaced, straight, parallel end portions, comprising: a support including spaced-apart vertical legs, a horizontal base on the lower ends thereof, and means for detachably securing the respective legs to the respective handles at the upper ends of the legs, said handles when secured to the legs being inclined slightly downwardly toward the saw blade; and a saw carriage including a log supporting table portion extending between the respective handles, wheels at opposite sides of the saw carriage rolling on the handles, said handles constituting tracks for the wheels, and a saw guard of inverted U-shape rigid with one side of the carriage and proportioned to straddle the saw blade on rolling of the carriage down the inclined handles.

BYRON A. FULLER.

REFERENCES CITED

The following references are of record in the file of this patent:

UNITED STATES PATENTS

| Number | Name | Date |
|---|---|---|
| 1,021,813 | Zimmerman | Apr. 2, 1912 |
| 1,039,338 | Wallace | Sept. 24, 1912 |
| 1,225,545 | Whitaker | May 8, 1917 |
| 1,316,743 | Roche et al. | Sept. 23, 1919 |
| 1,602,357 | Georgelis | Oct. 5, 1926 |
| 1,832,599 | Wilhelm et al | Nov. 17, 1931 |
| 2,312,287 | Renner | Feb. 23, 1943 |
| 2,330,996 | Rivers | Oct. 5, 1943 |
| 2,435,192 | Arneau | Feb. 3, 1948 |
| 2,461,384 | Kelly | Feb. 8, 1949 |

FOREIGN PATENTS

| Number | Country | Date |
|---|---|---|
| 542,508 | France | May 18, 1922 |
| 117,455 | Australia | Aug. 31, 1943 |